(12) United States Patent
Peck, Jr.

(10) Patent No.: US 6,272,266 B1
(45) Date of Patent: Aug. 7, 2001

(54) MULTIPATH OPTICAL COUPLER AND ASSOCIATED METHOD

(75) Inventor: James L. Peck, Jr., Huntington Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/399,234

(22) Filed: Sep. 17, 1999

(51) Int. Cl.$^7$ .................................................. G02B 6/32
(52) U.S. Cl. ......................... 385/34; 385/31; 385/33; 359/127; 359/131
(58) Field of Search .......................... 385/34, 33, 31, 385/32, 44; 359/131, 127

(56) References Cited

U.S. PATENT DOCUMENTS

| | | | |
|---|---|---|---|
| 4,234,969 | * 11/1980 | Singh | 455/607 |
| 5,000,531 | 3/1991 | Burberry . | |
| 5,159,190 | * 10/1992 | Hohberg | 250/227.24 |
| 5,666,448 | 9/1997 | Schoenwald et al. . | |
| 5,757,994 | * 5/1998 | Schoenwald | 385/44 |
| 5,761,357 | 6/1998 | Peck, Jr. . | |
| 5,809,187 | * 9/1998 | Peck, Jr. et al. | 385/24 |
| 5,883,993 | 3/1999 | Peck, Jr. . | |
| 5,892,868 | 4/1999 | Peck, Jr. et al. . | |
| 5,894,534 | 4/1999 | Peck, Jr. . | |
| 5,920,411 | * 7/1999 | Duck | 359/127 |
| 6,055,347 | * 4/2000 | Li | 385/34 |

FOREIGN PATENT DOCUMENTS

| | | |
|---|---|---|
| 0080829 A2 | 6/1983 | (EP) . |
| 0482474 A2 | 4/1992 | (EP) . |
| 0874255 A2 | 10/1998 | (EP) . |
| 0874256 A2 | 10/1998 | (EP) . |
| 0874259 A2 | 10/1998 | (EP) . |
| 54-158242 | 12/1979 | (JP) . |
| 60-147715 | 8/1985 | (JP) . |

\* cited by examiner

*Primary Examiner*—Cassandra Spyrou
*Assistant Examiner*—Leo Boutsikaris
(74) *Attorney, Agent, or Firm*—Alston & Bird LLP

(57) ABSTRACT

Initial optical signals propagate downstream through a primary transmitting GRIN lens and a primary receiving GRIN lens that are joined at an optical interface. A secondary transmitting GRIN lens, or another type of optical device, is joined to the primary receiving GRIN lens at the optical interface, and a secondary receiving GRIN lens, or another type of optical device, is joined to the primary transmitting GRIN lens at the optical interface. Extracted optical signals are transmitted from the primary transmitting GRIN lens to the secondary receiving GRIN lens and, inserted optical signals are transmitted from the secondary transmitting GRIN lens into the primary receiving GRIN lens. The secondary GRIN lenses are angularly displaced from one another so that extracted optical signals consist solely of the information of the initial optical signals and an extracted portion of the optical energy of the initial optical signals. A composite optical signal, which propagates downstream through the receiving GRIN lens, includes the information of the initial optical signals, the unextracted portion of the optical energy of the initial optical signals, and all of the inserted optical signals. The secondary GRIN lenses are substantially smaller than the primary GRIN lenses, such that the secondary GRIN lenses have a minimal impact upon the transmission of the initial optical signals from the primary transmitting GRIN lens to the primary receiving GRIN lens.

20 Claims, 2 Drawing Sheets

MULTIPATH OPTICAL COUPLER AND ASSOCIATED METHOD

FIELD OF THE INVENTION

The present invention relates generally to couplers for fiber optic cables and, more particularly, to methods and apparatus for transmitting an inserted optical signal into an optical coupler and transmitting an extracted optical signal from the optical coupler so that the extracted optical signal does not contain any aspect of the inserted optical signal.

BACKGROUND OF THE INVENTION

It is well known to use fiber optic systems to carry optical signals. Optical signals can be characterized as including optical energy, and optical signals may additionally include information, such as data, audio or video information.

Fiber optic systems have a number of features that make them superior, in some applications, to systems that use traditional copper cables, or the like. For example, fiber optic systems can have a much larger information-carrying capacity and are not subject to electrical interference. In addition, signals transmitted over long-distance optic fibers need less amplification tham do signals transmitted over copper cables of equal length.

In a fiber optic system, it is typical for two optic fibers to be fused in an end-to-end arrangement to provided a continuous length of optic fiber. It is also common for optic fibers to be fused in a side-by-side arrangement, in which an elongate section of one optic fiber is fused to an elongate section of another optic fiber so that optical signals are transferred between the fused fibers. Such a side-by-side fused optical interface, which can be characterized as a passive fusion coupler, allows for good transfer of optical signals between the fused optic fibers, but provides no control over the direction of transfer and little or no control over the amount of optical energy transferred. Whereas it may be desired for optical signals to be transferred only from a first of the fused optic fibers to a second of the fused optic fibers in a passive fusion coupler, optical signals may also be transferred in the opposite, undesired direction, i.e., from the second optic fiber to the first optic fiber. Thus, passive fusion couplers are disadvantageous in some applications, such as where it is desired to use a single coupler to transmit optical signals via an optical path and receive optical signals from the same path while keeping any of the transmitted signals separate from the received signals.

It is also common for fiber optic systems to include powered couplers. A powered coupler includes an optical receiver, such as a photo detector, that receives optical signals, converts the optical signals into electronic data, and supplies the electronic data to another powered coupler that transmits optical signals. Whereas powered couplers can detect information on one optic fiber and transmit the information on another optic fiber, some aspects of the original optical signals may be lost in the transfer, such as the energy level, frequency or amplitude of the original optical signal, which can be disadvantageous in some applications.

SUMMARY OF THE INVENTION

The present invention solves the above problems, and other problems, by providing methods and apparatus for facilitating the transmission of inserted optical signals into, and the reception of extracted optical signals from, an optic device through which initial optical signals can be propagating irrespective of the inserted optical signals and the extracted optical signals, and in which the extracted optical signals do not contain any aspect of the inserted optical signals.

In accordance with one aspect to the present invention, the initial optical signals propagate in a downstream direction through the optic device, and both the transmission of the inserted optical signals into the optic device and the reception of the extracted optical signals from the optic device are carried out at what can be characterized as a common, planar optical interface that is perpendicular to the direction of propagation of the initial optical signals. The transmissions are carried out so that the extracted optical signals contain solely the information contained by the initial optical signals, and the extracted optical signals contains less optical energy than the initial optical signals.

More specifically, the initial optical signals Lre transmitted into an upstream end of the optic device so that the initial optical signals propagate toward a downstream end of the optic device, the inserted optical signals are transmitted into the optic device at the optical interface, the extracted optical signals are received from the optic device at the optical interface, and composite optical signals propagate downstream through the optic device from the optical interface and are transmitted from the downstream end of the optic device. The extracted optical signals consist solely of the information of the initial optical signals and an extracted portion of the optical energy of the initial optical signals. In contrast, the composite optical signals transmitted from the downstream end of the optic device include the information of the initial optical signals, the unextracted portion of the optical energy of the initial optical signals, and all of the inserted optical signals.

In accordance with one embodiment of the present invention, methods of the present invention are carried out through the use of a plurality of gradient index (GRIN) lenses, or the like that are assembled to form an optic device having opposed upstream and downstream ends. The above-discussed optic device includes a primary transmitting GRIN lens having opposite first and second ends, and is operative to collimate optical signals propagating therethrough. The collimated signals are emitted via the first end of the primary transmitting GRIN lens, while the second end of the primary transmitting GRIN lens serves as the upstream end of the optic device. The optic device further includes a primary receiving GRIN lens having opposite first and second ends, and operative to focus optical signals propagating therethrough and emitted via the second end thereof. The first end of the primary receiving GRIN lens is optically connected to the first end of the primary transmitting GRIN lens at the optical interface, such that the primary transmitting GRIN lens is operative for transmitting collimated optical signals to the primary receiving GRIN lens. The ;econd end of the primary receiving GRIN lens serves as the downstream end of the optic device.

A secondary transmitting GRIN lens has opposite first and second ends and is operative to collimate optical signals propagating therethrough and emitted via the first end thereof. The first end of the secondary transmitting GRIN lens is optically connected to the first end of the primary receiving GRIN lens at the optical interface, such that the secondary transmitting GRIN lens is operative for transmitting collimated optical signals to the primary receiving GRIN lens. A secondary receiving GRIN lens also has opposite first and second ends and is operative to focus optical signals propagating therethrough and emitted via the second end thereof. The first end of the secondary receiving GRIN lens is optically connected to the first end of the primary transmitting GRIN lens at the optical interface, such that the primary transmitting GRIN lens is operative for transmitting collimated optical signals to the secondary GRIN lens.

The initial optical signals are introduced into the second end of the primary transmitting GRIN lens. The information of the initial optical signals and the unextracted portion of the optical energy of the initial optical signals are transmitted from the first end of the primary transmitting GRIN lens to the first end of the primary receiving GRIN lens. The information of the initial optical signals and the extracted portion of the optical energy of the initial optical signals are transmitted from the first end of the primary transmitting GRIN lens to the first end of the secondary receiving GRIN lens. The inserted optical signals are introduced into the second end of the secondary transmitting GRIN lens, and the inserted optical signals are transmitted from the first end of the secondary transmitting GRIN lens solely to the first end of the primary receiving GRIN lens, in contrast to no initial optical signals that split between the primary and secondary receiving lens. The composite optical signals, which include the information of the initial optical signals, the unextracted portion of the optical energy of the initial optical signals, and the inserted optical signals, propagate through the primary receiving GRIN lens and are transmitted from the second end of the primary receiving GRIN lens. The extracted optical signals, which consist solely of the information of the initial optical signals and the extracted portion of the optical energy of the initial optical signals, propagate through the secondary receiving GRIN lens and are transmitted from the second end of the secondary receiving GRIN lens.

In accordance with another aspect of the present invention, the primary transmitting GRIN lens and the primary receiving GRIN lens are substantially coaxial, such that a common axis extends through both of the primary GRIN lenses. In addition, the secondary transmitting GRIN lens and the secondary receiving GRIN lens are displaced from the axis of the primary GRIN lenses, and the secondary GRIN lenses are displaced from one another, so that optical propagation envelopes of the secondary GRIN lenses do not overlap one another.

The present invention advantageously provides for the transmission of the inserted optical signals into the primary receiving GRIN lens at the optical interface and the reception of the extracted optical signals from the primary transmitting GRIN lens at the optical interface. Advantageously, the extracted optical signals do not contain any of the information or optical energy of the inserted optical signals. The ability to keep the inserted and extracted optical signals separate from one another in a single passive optical device is useful in numerous optical communication and amplification circuits, such as a circuit for optical frequency modulation detection.

In accordance with another aspect of the present invention, the secondary GRIN lenses are substantially smaller than the primary GRIN lenses, such that the secondary GRIN lenses have a minimal impact upon the transmission of the initial optical signals from the primary transmitting GRIN lens to the primary receiving GRIN lens. That is, low optical energy losses are experienced in the transmission of the initial optical signals from the primary transmitting GRIN lens to the primary receiving GRIN lens. As will be apparent. low optical energy losses are advantageous in optical systems.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
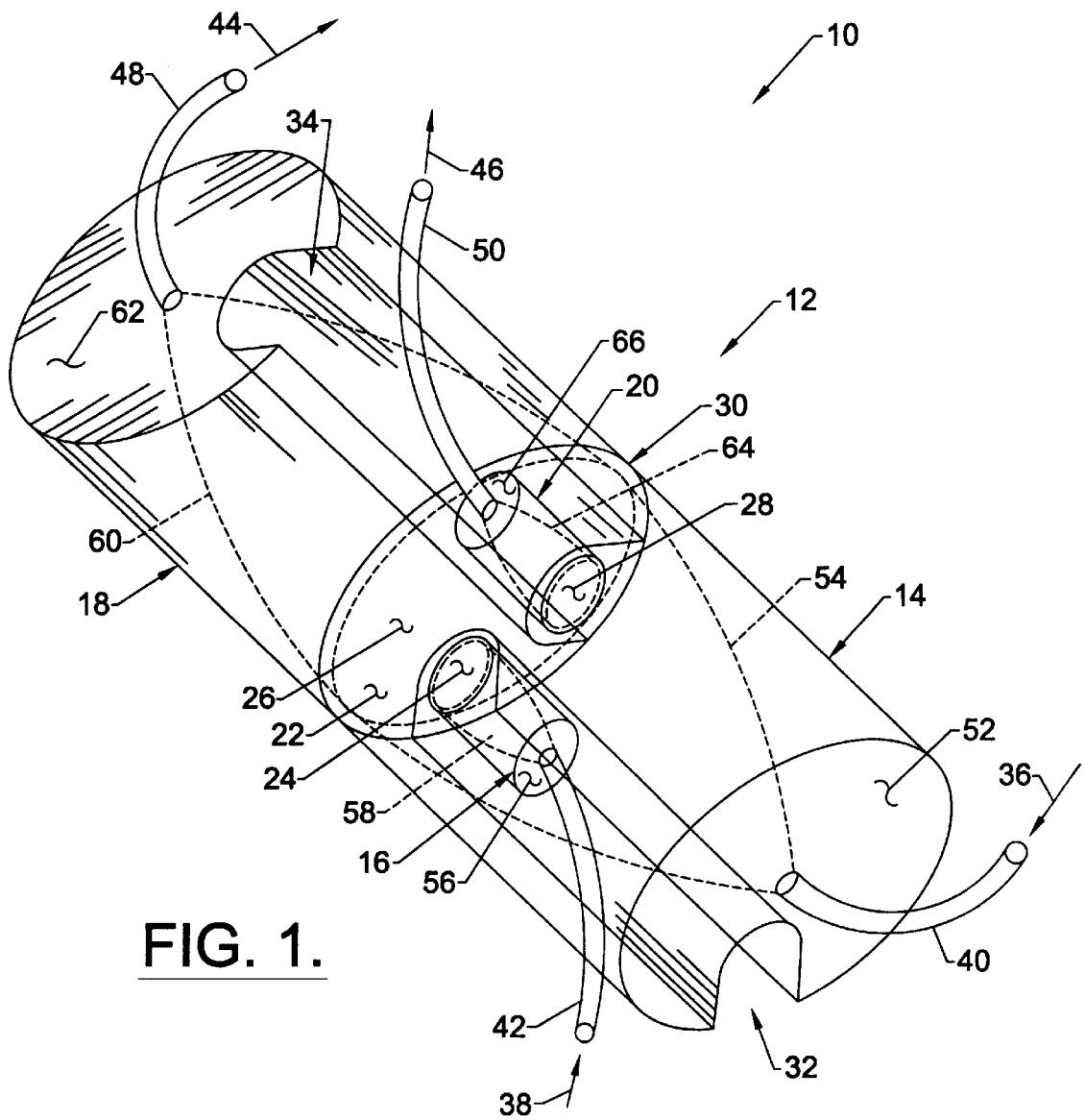
FIG. 1 is a diagrammatic perspective view of an optical coupler according to an embodiment of the present invention.

Referring to FIG. 1, an optical coupler 10 according to an embodiment of the present invention will be described. The optical coupler 10 includes a lens assembly 12 having multiple optic devices 14, 16, 18 and 20, each of which can be characterized as having a focused end and a collimated end. Each of the optic devices 14, 16, 18 and 20 have similar operational characteristics. Optical signals appropriately transmitted from a point source, or the like, to the focused end of a representative one of the optic devices 14, 16, 18 and 20 propagate through the representative optic device to the collimated end and are collimated, whereas collimated optical signals appropriately transmitted to the collimated end of the representative optic device propagate through the representative optic device to the focused end and are focused, as will be discussed in greater detail below. Throughout this disclosure, optical signals should be understood to include optical signals of the type used to transmit power or used in optical communication, such as signals in the visible and the infrared portion of the electromagnetic spectrum. Such optical signals can be characterized as including optical energy, and optical signals may additionally include information, such as, but not limited to, data, audio or video information.

Each of the optic devices 14, 16, 18 and 20 of the lens assembly 12 may be provided by a series of separate standard lenses, or the like. Nonetheless, in accordance with the embodiment of the present invention that is illustrated in FIG. 1, the optic devices 14, 16, 18 and 20 are generally cylindrical gradient index (GRIN) lenses. GRIN lenses are conventional and known to those skilled in the art. Each of the GRIN lenses 14, 16, 18 and 20 are preferably capable of functioning so that collimated optical signals appropriately entering the collimated end thereof are focused at a point that is a quarter of the wavelength of the optical signals from the collimated end. Conversely, each of the GRIN lenses 14, 16 18 and 20 are preferably capable of functioning so that optical signals appropriately entering the focused end thereof from a point source, or the like, are collimated at a point that is a quarter of the wavelength of the optical signals from the focused end.

The lens assembly 12 can be characterized as including a primary transmitting GRIN lens 14 and at least one secondary transmitting GRIN lens 16, which have collimated ends 22 and 24, respectively, that are optically connected to a collimated end 26 of a primary receiving GRIN lens 18 at an optical interface 30. The lens assembly 12 can be further characterized as including at least one secondary receiving GRIN lens 20, which has a collimated end 28 that is optically connected to the collimated end 22 of the primary transmitting GRIN lens 14 at the optical interface 30. Whereas only two secondary GRIN lenses 16 and 20 are included in the illustrated embodiment of the present invention, other embodiments of the present invention include a greater number of secondary GRIN lenses. In accordance with the illustrated embodiment of the present invention, the referenced optical connections between the GRIN lenses 14, 16, 18 and 20 at the optical interface 30 are provided by mounting their respective collimated ends 22, 24, 26 and 28 to one another, such as with conventional optical adhesives, or the like.

The optical interface 30 includes a quarter wave length optical interface between the collimated end 22 of the primary transmitting GRIN lens 14 and adjacent collimated ends 26 and 28 of the receiving GRIN lenses 18 and 22, respectively. The optical interface 30 also includes a quarter wave length optical interface between the collimated end 24 of the secondary transmitting GRIN lens 24 and the collimated end 26 of the primary receiving GRIN lens 18. Those quarter wave length optical interfaces are all identified by the numeral 30 in FIG. 1. The concept of quarter wave length optical interfaces is known to those skilled in the art.

In accordance with the illustrated embodiment of the present invention, separate axially extending cavities or notches 32 and 34 are respectively defined in the primary GRIN lenses 14 and 18, for respectively housing the secondary GRIN lenses 16 and 20. The sizes of the notches 32 and 34 depicted in FIG. 1 are exaggerated so as to clarify the figure. Whereas the notches 32 and 34 are shown as being relatively close to one another in FIG. 1. in accordance with another embodiment of the invention, the notches, and therefore the secondary GRIN lenses 16 and 20, are more distant from one another than is illustrated. Even though the secondary GRIN lenses 16 and 20 are shown within the notches 32 and 34 formed in the side of the primary GRIN lenses 14 and 18, other arrangements for providing the respective optical communications between the primary GRIN lenses and the secondary GRIN lenses are within the scope of the present invention.

In accordance with the illustrated embodiment of the present invention, initial optical signals 36 and inserted optical signals; 38 are transmitted to the lens assembly 12 by inlet optic fibers 40 and 42, respectively. Further, composite optical signals 44 and extracted optical signals 46 are transmitted from the lens assembly 12 by outlet optical fibers 48 and 50, respectively.

The initial optical signals 36, which are delivered by the inlet optic fiber 40, arrive at the focused end 52 of the primary transmitting GRIN lens 14. The initial optical signals 36 are transmitted to the focused end 52 of the plimary transmitting GRIN lens 14 generally at the central axis of the primary transmitting GRIN lens and perpendicular to the focused end 52. That is, the initial optical signals 36 delivered by the optic fiber 40 are imparted upon the focal center of the focused end 52 of the primary transmitting GRIN lens 14, as shown in dashed lines by generally conical propagation envelope 54. The primary transmitting GRIN lens 14 is preferably a quarter wave length GRIN lens so as to receive the initial optical signals 36 from a point source, or the like, at its focused end 52, and transmit the initial optical signals as a collimated beam at its collimated end 22, as shown by the propagation envelope 54.

The inserted optical signals 38, which are delivered by the inlet optic fiber 42, arrive at the focused end 56 of the secondary transmitting GRIN lens 16. The inserted optical signals 38 are transmitted to, or inserted into, the focused end 56 of the secondary transmitting GRIN lens 16 generally at the central axis of the secondary transmitting GRIN lens and perpendicular to the focused end 56. That is, the optical signals 38 delivered by the optic fiber 42 are imparted upon the focal center of the focused end 56 of the secondary transmitting GRIN lens 16, as shown in dashed lines by generally conical propagation envelope 58. The secondary transmitting GRIN lens 16 is preferably a quarter wave length GRIN lens so as to receive the inserted optical signals 38 from a point source, or the like, at its focused end 56, and transmit the inserted optical signals as a collimated beam at its collimated end 24, as shown by the propagation envelope 58.

The collimated end 22 of the primary transmitting GRIN lens 14 transmits the collimated initial optical signals 36 perpendicularly through the quarter wave length optical interface 30 to the collimated ends 26 and 28 of the receiving GRIN lenses 18 and 20, respectively. As will be discussed in greater detail below, the collimated end 28 of the secondary receiving GRIN lens 20 is relatively small compared to the collimated end 26 of the primary receiving GRIN lens 18. Whereas both of the receiving GRIN lenses 18 and 20 receive the information of the initial optical signals 36, the secondary receiving GRIN lens receives, or extracts, only a small percentage of the optical energy of the initial optical signals 36, which can be characterized as an extracted portion of the optical energy of the initial optical signal. For example, in accordance with one embodiment of the present invention, the secondary receiving GRIN lens 20 preferably receives only approximately five percent of optical energy of the initial optical signals 36 being transmitted from the collimated end 22 of the primary transmitting GRIN lens 14, and the primary receiving GRIN lens 18 receives the remainder of that optical energy, which can be characterized as an unextracled portion of the optical energy of the initial optical signal.

The collimated end 24 of the secondary transmitting GRIN lens 16 transmits the collimated inserted optical signals 38 perpendicularly through the quarter wave length optical interface 30 to the collimated end 26 of the primary receiving GRIN lens 18. The secondary GRIN lenses 16 and 20 are preferably positioned and operative so that none of the inserted optical signals 38 are transmitted to the secondary receiving GRIN lens 20.

That which is transmitted into the collimated end 26 of the primary receiving GRIN lens 18, which includes the unextracted portion of the optical energy of the initial optical signals 36, the information of the initial optical signals, and the inserted optical signals 38, can be characterized as composite optical signals 44, which are transmitted from the primary receiving GRIN lens 18 by way of outlet optical fiber 48. In accordance with an embodiment of the present invention, the initial optical signals 36 have a different frequency and/or wavelength than the inserted optical signals 38, such that the composite optical signals 44 are multiplexed signals. The composite optical signals 44, which are in a collimated form at the collimated end 26 of the primary receiving GRIN lens 18, are focused within the primary receiving GRIN len, as shown in dashed lines by generally conical propagation envelope 60. The composite optical signals 44 travel through the primary receiving GRIN lens 18 along a path shown by the propagation envelope 60 to exit at the focused end 62 of the primary receiving GRIN lens and travel through the optic fiber 48.

The extracted portion of the optical energy of the initial optical signals 36 and the information of the initial optical signals that are transmitted into collimated end 28 of the secondary receiving GRIN lens 20 can be characterized as extracted optical signals 46, which are transmitted from the secondary receiving GRIN lens 20 by way of outlet optic fiber 50. As will be discussed in greater detail below, the extracted optical signals 46 do not include any portion of the inserted optical signals 38. In other words, the inserted optical signals are not mixed with the optical signals that are extracted. The extracted optical signals 44, which are in a collimated form at the collimated end 28 of the secondary receiving GRIN lens 20, and thereafter are focused within the secondary receiving GRIN lens, as shown in dashed lines by generally conical propagation envelope 64. The extracted optical signals 46 travel through the secondary receiving GRIN lens 20 along a path shown by the propagation envelope 64 to exit at the focused end 66 of the secondary receiving GRIN lens and travel through the outlet optic fiber 50.

The collimated end 24 of the secondary transmitting GRIN lens 16 is nearly coplanar with the collimated end 28 of the secondary receiving GRIN lens 20, but those collimated ends do not overlap. Therefore, none of the optical signals 38 inserted by the secondary transmitting GRIN lens are received by the secondary receiving GRIN lens 20. Therefore, the extracted optical signals 46 include only the information of the initial optical signals 36 and the extracted portion of the optical energy of the initial optical signals. That is, the extracted optical signals 46 do not include any component of the inserted optical signals 38.

Figure 2:
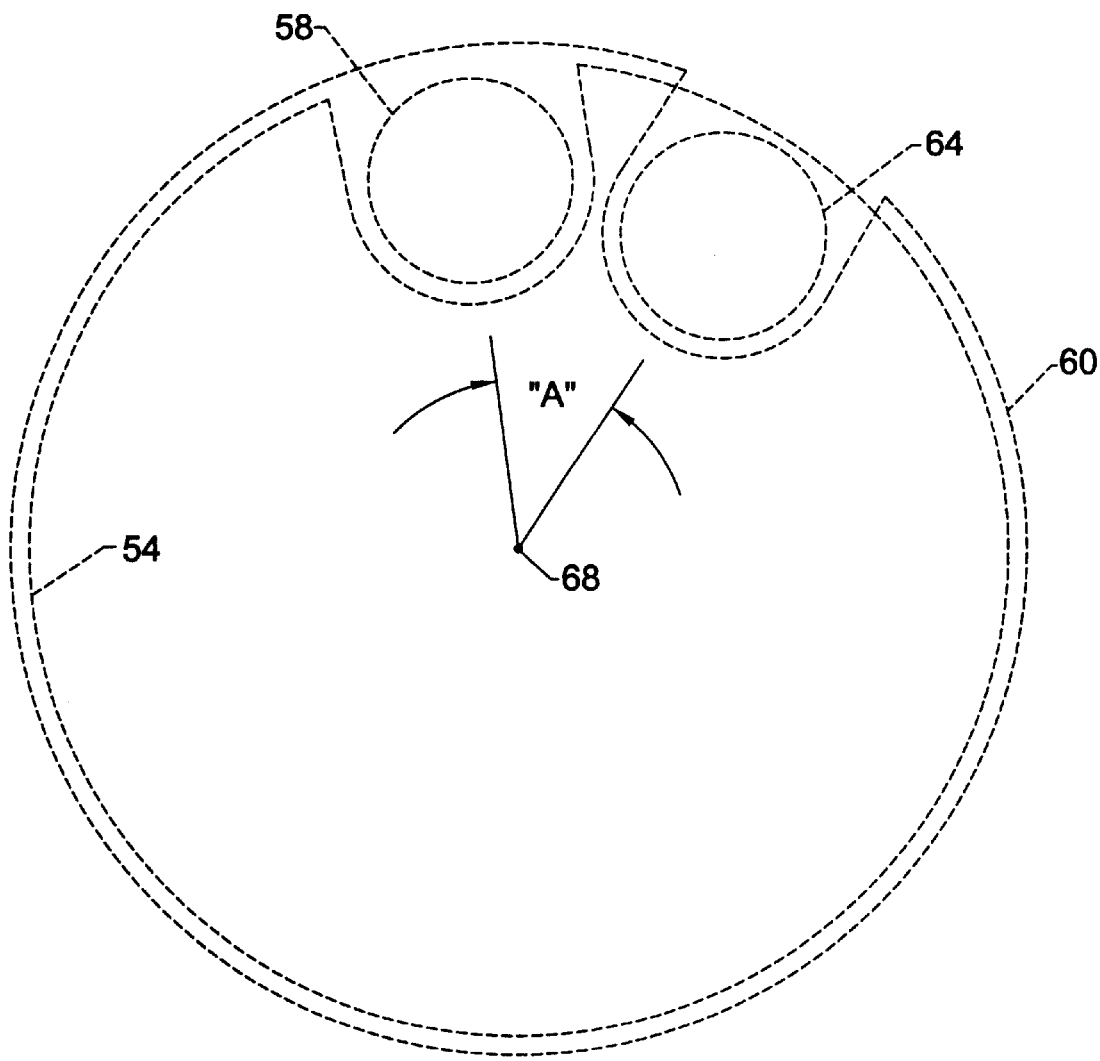
FIG. 2 is a diagrammatic, isolated, end elevation view of collimated ends of the propagation envelopes of the optical coupler of FIG. 1, wherein the collimated ends are shown in dashed lines.

FIG. 2 is diagrammatic, isolated, end elevation view of collimated ends of the propagation envelopes 54, 58, 60 and 64 of the optical coupler 10 (FIG. 1), in accordance with an embodiment of the present invention. As best seen in FIG. 2, a majority of the collimated end of the propagation envelope 54 of the primary transmitting GRIN lens 14 (FIG. 1) is within the collimated end of the propagation envelope 60 of the primary receiving GRIN lens 18 (FIG. 1). The entirety of the collimated end of the propagation envelope 58 of the secondary transmitting GRIN lens 16 (FIG. 1) is within the collimated end of the propagation envelope 60 of the primary receiving GRIN lens 18, and the periphery of the collimated end of the propagation envelope 58 preferably touches the periphery of the propagation envelope 60. Similarly, the entirety of the collimated end of the propagation envelope 64 of the secondary receiving GRIN lens 16 (FIG. 1) is within the collimated end of the propagation envelope 54 of the primary transmitting GRIN lens 14, and the periphery of the collimated end of the propagation envelope 64 preferably touches the periphery of the propagation envelope 54.

Whereas the collimated end of the propagation envelope 60 is illustrated in FIG. 2 as having a larger diameter than the collimated end of the propagation envelope 54, it is preferred for the diameters of the collimated ends of those propagation envelopes to be approximately equal and for those propagation envelopes to be coaxial. As best seen in FIG. 2, it is preferred for the primary GRIN lenses 14 and 18 (FIG. 1) to be substantially coaxial, whereby a common central axis 68 extends through both of the primary GRIN lenses and their propagation envelopes 54 and 60. The centers of the secondary GRIN lenses 16 and 20 (FIG. 1), or more specifically the centers of the collimated ends of their propagation envelopes 58 and 64, are preferably the same distance from the axis 68. The centers of the secondary GRIN lenses 16 and 20, or more specifically the centers of the collimated ends of their propagation envelopes 58 and 64, are preferably angularly displaced from one another by an angle "A" defined with respect to the axis 68. The angle "A" is selected so that the propagation envelopes 58 and 64 do not overlap, which results in the extracted optical signals 46 (FIG. 1) not containing any of the information or optical energy of the inserted optical signals 38 (FIG. 1). The ability to keep the inserted and extracted optical signals 38 and 46 separate from one another in a single passive optical device is useful in numerous optical communication and amplification circuits, such as a circuit for optical frequency modulation detection.

In accordance with one embodiment of the present invention, the collimated end of the propagation envelope 54 completely bounds an area of approximately 16 mm$^2$, the collimated end of the propagation envelope 58 completely bounds an area of approximately 0.6 mm$^2$, the collimated end of the propagation envelope 60 completely bounds an area of approximately 16 mm$^2$ and the collimated end of the propagation envelope 64 completely bounds an area of approximately 0.6 mm$^2$. Whereas the secondary GRIN lenses 16 and 20 have been described as being the same size, they may be sized differently from one another.

Because the collimated ends of the propagation envelopes 58 and 64 are relatively small compared to the collimated ends of the propagation envelopes 54 and 60, the secondary GRIN lenses 16 and 20 (FIG. 1) have a minimal effect/do not interfere much with the transmission of the initial optical signals 36 (FIG. 1) from the collimated end 22 (FIG. 1) of the primary transmitting GRIN lens 14 (FIG. 1) to the collimated end 26 (FIG. 1) of the primary receiving GRIN lens 18 (FIG. 1). In accordance with one embodiment of the present invention, the loss in the transmission of the initial optical signals 36 from the primary transmitting GRIN lens 14 to the primary receiving GRIN lens 18 that is caused by the insertion of the inserted optical signals 38 (FIG. 1) and the extraction of the extracted optical signals 46 (FIG. 1) is preferably in a range of approximately three to ten percent of the optical energy that would be transmitted from the collimated end 22 of the primary transmitting GRIN lens 14 to the collimated end 26 of the primary receiving GRIN lens 18, if those primary GRIN lenses did not have associated therewith the notches 32 and 34 (FIG. 1) or the secondary GRIN lenses 16 and 18. That is, in accordance with one embodiment of the present invention, the shadows caused by optical signals falling on or being refracted by the notches 32, 34 and the secondary GRIN lenses 16, 18 result in losses in a range of approximately three to ten percent. Of course those losses will vary depending upon the sizes of the notches 32, 34 and the secondary GRIN lenses 16, 18. Such low optical energy losses are advantageous in an optical system.

In accordance with an alternative embodiment of the present invention, one or both of the secondary GRIN lenses 16 and 18 and the optic fibers leading thereto can be replaced with optical devices other than GRIN lenses. For example, one or both of the secondary GRIN lenses 16 and 18 can be replaced with an optical detector, such as a light sensitive diode, or the like, and/or one or both of the secondary GRIN lenses can be replaced with an optical transmitter, such as a light emitting diode, or the like.

Whereas the present invention has been described in the context of specific signals for purposes of explanation, those of ordinary skill in the art will appreciate that the device of the present invention can fully duplex. Optical signals can be inserted into any and all of the ports of the device of the present invention at the same or different times, and those optical signals can be respectively separated from one another at downstream locations. In addition, the device of the present invention can operate with coherent or noncoherent light, and with optical signals of all of the different optical frequencies.

Many modifications and other embodiments of the invention will come to mind to one skilled in the art to which this invention pertains having the benefit of the teachings presented in the foregoing descriptions and the associated drawing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is :

1. An optic system, comprising:
  a first optic device having opposite first and second ends, and operative to collimate a first optical signal propagating therethrough and emitted via the first end;
  a second optic device having opposite first and second ends, and operative to focus any optical signal propagating therethrough and emitted via the second end thereof, wherein the first end of the second optic device is optically connected to the first end of the first optic device such that the first optic device transmits the first optical signal in a first direction to the second optic device, with the first optical signal not being substantially reflected or refracted at any position between the first and second optic devices;
  a third optic device having opposite first and second ends, wherein the first end of the third optic device is optically connected to the first end of the second optic device such that the third optic device transmits a second optical signal substantially in the first direction to the second optic device, with the second optical signal not being substantially reflected or refracted at any position between the third and second optic devices; and
  a fourth optic device having opposite first and second ends, wherein the first end of the fourth optic device is optically connected to the first end of the first optic device such that the first optic device transmits the first optical signal substantially in the first direction to the fourth optic device, with the first optical signal not being substantially reflected or refracted at any position between the first and fourth optic devices,
  wherein the third and fourth optic devices are arranged and operative so that the fourth optic device does not receive the second optical signal transmitted from the third optic device.

2. An optic system according to claim 1, wherein:
  the first optic device is a first lens device;
  the second optic device is a second lens device;
  the third optic device is a third lens device that is operative to collimate optical signals propagating therethrough and emitted via the first end thereof; and
  the fourth optic device is a fourth lens device that is operative to focus optical signals propagating therethrough and emitted via the second end thereof.

3. An optic system according to claim 2, wherein the first end of the fourth lens device is substantially smaller than the first end of the second lens device such that substantially more optical energy is transferred from the first lens device to the second lens device than from the first lens device to the fourth lens device.

4. An optic system according to claim 2, further comprising:
  a first optic fiber optically connected to the second end of the first lens device;
  a second optic fiber optically connected to the second end of the second lens device;
  a third optic fiber optically connected to the second end of the third lens device; and
  a fourth optic fiber optically connected to the second end of the fourth lens device.

5. An optic system according to claim 2, wherein:
  the first lens device and the second lens device are substantially coaxial, whereby an axis extends through both the first lens device and the second lens device; and
  the third lens device and the fourth lens device are angularly displaced from one another with respect to the axis.

6. An optic system according to claim 5, wherein:
  the third lens device is a first distance from the axis; and
  the fourth lens device is a second distance from the axis, and the first and second distances are substantially similar.

7. An optic system according to claim 2, wherein the first lens device comprises a first gradient index lens, the second lens device comprises a second gradient index lens, the third lens device comprises a third gradient index lens, and the fourth lens device comprises a fourth gradient index lens.

8. An optic system according to claim 7, wherein the first gradient index lens defines a cavity and the third gradient index lens is at least partially within the cavity.

9. An optic system according to claim 8, wherein the second gradient index lens defines a cavity and the fourth gradient index lens is at least partially within the cavity.

10. An optic system, comprising:
  a first lens device comprising opposite upstream and downstream ends and operative such that at least a first optical signal can propagate from the upstream end to the downstream end;
  a second lens device operative for transmitting at least a second optical signal in a first direction to the first lens device at an insertion location of the first lens device, wherein the second optical signal is not substantially reflected or refracted at any position between the second lens device and the insertion location, and the insertion location is between the upstream and downstream ends at a predetermined distance from the upstream end; and
  a third lens device operative for extracting a portion of the first optical signal from the first lens device at an extraction location of the first lens device so that first lens device is for transmitting a portion of the first optical signal substantially in the first direction to the third lens device at the extraction location, wherein the portion of the first optical signal is not substantially reflected or refracted at any position between the third lens device and the extraction location, and the extraction location is between the upstream and downstream ends and at the predetermined distance from the upstream end, that is at least as great as the predetermined distance from the upstream end that said second lens device is spaced and the extraction location.

11. An optic system according to claim 10, wherein the extraction location is angularly displaced from the insertion location.

12. An optic system according to claim 10, further comprising an optic fiber operative for transmitting the first optical signal to the upstream end of the first lens device.

13. An optic system according to claim 10, wherein:

the second lens device comprises a gradient index lens; and the third lens device comprises a gradient index lens.

14. An optic system according to claim 10, wherein the first lens device comprises:

a fourth lens device having opposite first and second ends, and operative to collimate optical signals propagating therethrough and emitted via the first end, wherein the second end of the fourth lens device is the upstream end of the first lens device; and a fifth lens device having opposite first and second ends, and operative to focus optical signals propagating therethrough and emitted via the second end thereof, wherein the first end of the fifth lens device is optically connected to the first end of the fourth lens device such that the fourth lens device is operative for transmitting collimated optical signals to the fifth lens device, and the second end of the fifth lens device is the downstream end of the first lens device.

15. An optic system according to claim 14, wherein:

the second lens device comprises a gradient index lens;

the third lens device comprises a gradient index lens;

the fourth lens device comprises a gradient index lens; and the fifth lens device comprises a gradient index lens.

16. An optic system according to claim 10, wherein the insertion and extraction locations are at about the same distance from the upstream end and are spaced apart from one another.

17. An optic system according to claim 15, wherein the third lens device is mounted to the first end of the fourth lens device, the first end of the fifth lens device is mounted to the first end of the fourth lens device, and the second lens device is mounted to the first end of the fifth lens device.

18. An optic system, comprising:

a first gradient index lens having opposite first and second ends, and operative to collimate optical signals propagating therethrough and emitted via the first end;

a second gradient index lens having opposite first and second ends, and operative to focus optical signals propagating therethrough and emitted via the second end thereof, wherein the first end of the second gradient index lens is mounted to the first end of the first gradient index lens such that the first gradient index lens is operative for transmitting collimated optical signals to the second gradient index lens;

a third gradient index lens having opposite first and second ends and operative to emit optical signals via the first end thereof, wherein the first end of the third gradient index lens is mounted to the first end of the second gradient index lens such that the third gradient index lens is operative for transmitting collimated optical signals to the second gradient index lens; and a fourth gradient index lens having opposite first and second ends, and operative to receive optical signals, wherein the first end of the fourth gradient index lens is mounted to the first end of the first gradient index lens such that the first gradient index lens is operative for transmitting collimated optical signals to the fourth gradient index lens, wherein the third and fourth gradient index lenses are arranged and operative so that the fourth gradient index lens does not receive optical signals transmitted from the third gradient index lens.

19. An optic system according to claim 18, wherein the first end of the fourth gradient index lens is substantially smaller than the first end of the second gradient index lens such that substantially more optical energy is transferred from the first gradient index lens to the second gradient index lens than from the first gradient index lens to the fourth gradient index lens.

20. An optic system according to claim 18, wherein:

the first gradient index lens defines a cavity and the third gradient index lens is at least partially within the cavity, and the second gradient index lens defines a cavity and the fourth gradient index lens is at least partially within the cavity.

\* \* \* \* \*

UNITED STATES PATENT AND TRADEMARK OFFICE
CERTIFICATE OF CORRECTION

PATENT NO. : 6,272,266 B1  Page 1 of 1
DATED : August 7, 2001
INVENTOR(S) : Peck, Jr.

It is certified that error appears in the above-identified patent and that said Letters Patent is hereby corrected as shown below:

Column 10,
Line 61, after "location" insert -- is positioned such that a portion of the second optical signal is not extracted at the extraction location --.

Signed and Sealed this

Fourteenth Day of May, 2002

*Attest:*

JAMES E. ROGAN
*Attesting Officer*   *Director of the United States Patent and Trademark Office*